(12) United States Patent
Chainer et al.

(10) Patent No.: US 6,453,266 B1
(45) Date of Patent: Sep. 17, 2002

(54) PEAK DETECTING SHOCK GAUGE AND DAMAGE DIAGNOSTIC FOR MOBILE AND HANDHELD COMPUTERS

(75) Inventors: Timothy Joseph Chainer, Mahopac, NY (US); Karl-Friedrich Etzold, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,831

(22) Filed: Jan. 29, 1999

(51) Int. Cl.[7] ............................................. G21C 17/00
(52) U.S. Cl. ...................... 702/184; 340/506; 340/588
(58) Field of Search ............................ 702/187, 141, 702/56, 79, 182, 184; 73/649, 658; 340/521, 506, 588, 517, 524, 870.03, 870.09, 870.17

(56) References Cited

U.S. PATENT DOCUMENTS

| | | | | |
|---|---|---|---|---|
| 4,823,290 A | * | 4/1989 | Fasack et al. | 340/825.01 |
| 4,862,394 A | * | 8/1989 | Thompson et al. | 702/166 |
| 5,426,595 A | * | 6/1995 | Picard | 702/187 |
| 5,493,676 A | * | 2/1996 | Amnundson | 714/42 |
| 5,552,776 A | * | 9/1996 | Wade et al. | 340/5.74 |
| 5,644,510 A | * | 7/1997 | Weir | 702/132 |

* cited by examiner

Primary Examiner—Marc S. Hoff
Assistant Examiner—Mohamed Charioui
(74) Attorney, Agent, or Firm—McGinn & Gibb, PLLC; Marian Underweiser, Esq.

(57) ABSTRACT

A method and structure for preventing damage to an electronic device. The structure includes a sensor outputting signals indicating environmental conditions experienced by the electronic device, a non-volatile memory storing ones of the signals that exceed a limit, and an output device outputting signals stored in the non-volatile memory, thereby providing a history of the environmental conditions experienced by the electronic device that exceed the limit.

19 Claims, 2 Drawing Sheets

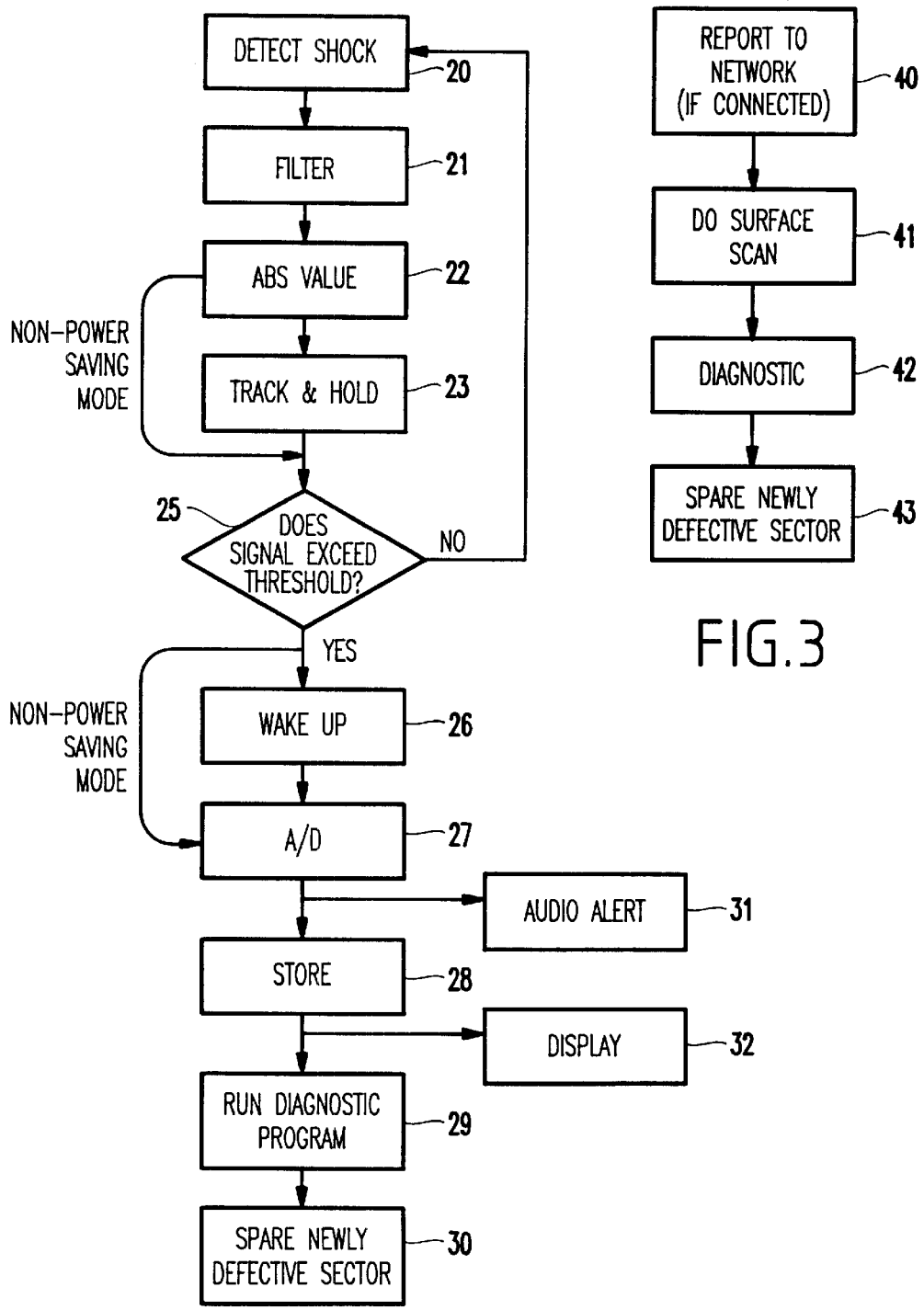

PEAK DETECTING SHOCK GAUGE AND DAMAGE DIAGNOSTIC FOR MOBILE AND HANDHELD COMPUTERS

BACKGROUND OF THE INVENTION

1. Field of the Invention

The present invention generally relates to damage control systems for electronic devices, such as laptop computers, and more particularly to recording an environmental condition history to determine whether diagnostic programs should evaluate the electronic device.

2. Description of the Related Art

It is well established that excessive shock impacts on electronic devices, such as magnetic disk files, can result in serious damage to the device. For example, impacts to magnetic disk files, may damage the recording surface, slider or the spindle or actuator bearing. To prevent excessive impacts careful handling of the electronic device or its components is required. Additionally, the components within electronic devices can be protected by cushioning material and other shock absorbing devices, such as compliant lossy equipment mounts.

Surprising results can be obtained if one measures the acceleration experienced by an electronic device during what is perceived to be normal handling. For example, peak g values can easily exceed several thousand g during metal to metal contacts. Even a metal to wood or plastic contact can produce g values in excess one thousand g. This is to be contrasted with a common limit specification of 200 g. It is evident that very careful handling is necessary to avoid premature damage.

Conventional systems are primarily directed to avoiding or absorbing impact shocks to electronic devices. In addition, there are conventional systems that a user may implement to diagnose the condition of an electronic device. For example, common diagnostic programs are available to examine the disk surfaces of a direct access storage device (DASD), such as a hard drive. However, there is a need to include environmental input information regarding when diagnostic procedures should be performed on various electronic devices.

SUMMARY OF THE INVENTION

It is, therefore, an object of the present invention to provide a structure and method for a system that produces a history of shock events on a laptop and combines this history with a thermal surface scan to establish the potential probability of failure for the hard disk. Damaged sectors can be automatically spared. If the laptop is connected to a network, data is uploaded into an appropriate database and the proper preventive maintenance can be performed automatically.

More specifically, the invention includes a method and structure for preventing damage to an electronic device. The structure includes a sensor outputting signals indicating environmental conditions experienced by the electronic device, a non-volatile memory storing ones of the signals that exceed a limit, and an output device outputting signals stored in the non-volatile memory, thereby providing a history of the environmental conditions experienced by the electronic device that exceed the limit.

The structure may also include an audible output device for generating a sound when the non-volatile memory detects a signal that exceeds the limit. Also, the signals indicate when the environmental conditions occurred and the magnitude of the environmental conditions.

In one embodiment, the non-volatile memory initiates a diagnostic program after the electronic device experiences acceleration that exceeds the limit, wherein the diagnostic program evaluates whether the acceleration has damaged the electronic device.

The structure may also include a peak detection unit storing a largest one of the signals. The non-volatile memory periodically samples the peak detection unit. The invention may further include a connection to a network, where the signals stored in the non-volatile memory are transmitted to the network.

Additionally, the sensor and the non-volatile memory operate when the electronic device is off and when the electronic device is on, while the output device operates only when the electronic device is on.

The inventive method includes detecting environmental conditions experienced by the electronic device, generating signals indicating the environmental conditions experienced by the electronic device, storing ones of the signals that exceed a limit, and outputting signals stored in the non-volatile memory, thereby providing a history of the environmental conditions experienced by the electronic device that exceed the limit.

In one embodiment, the invention can include generating a sound when the non-volatile memory detects a signal that exceeds the limit. The signals indicate when the environmental conditions occurred and a magnitude of the environmental conditions.

The method can also initiate a diagnostic program after the electronic device experiences acceleration that exceeds the limit, wherein the diagnostic program evaluates whether the acceleration has damaged the electronic device.

Also the invention can periodically store the largest signal, and periodically sample and reset the largest signal. Additionally, the invention may transmit the signals in the non-volatile memory to an external network.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a flow diagram illustrating a preferred method of the invention; and

FIG. 3 is a flow diagram illustrating a preferred method of the invention.

DETAILED DESCRIPTION OF PREFERRED EMBODIMENTS OF THE INVENTION

Figure 1:
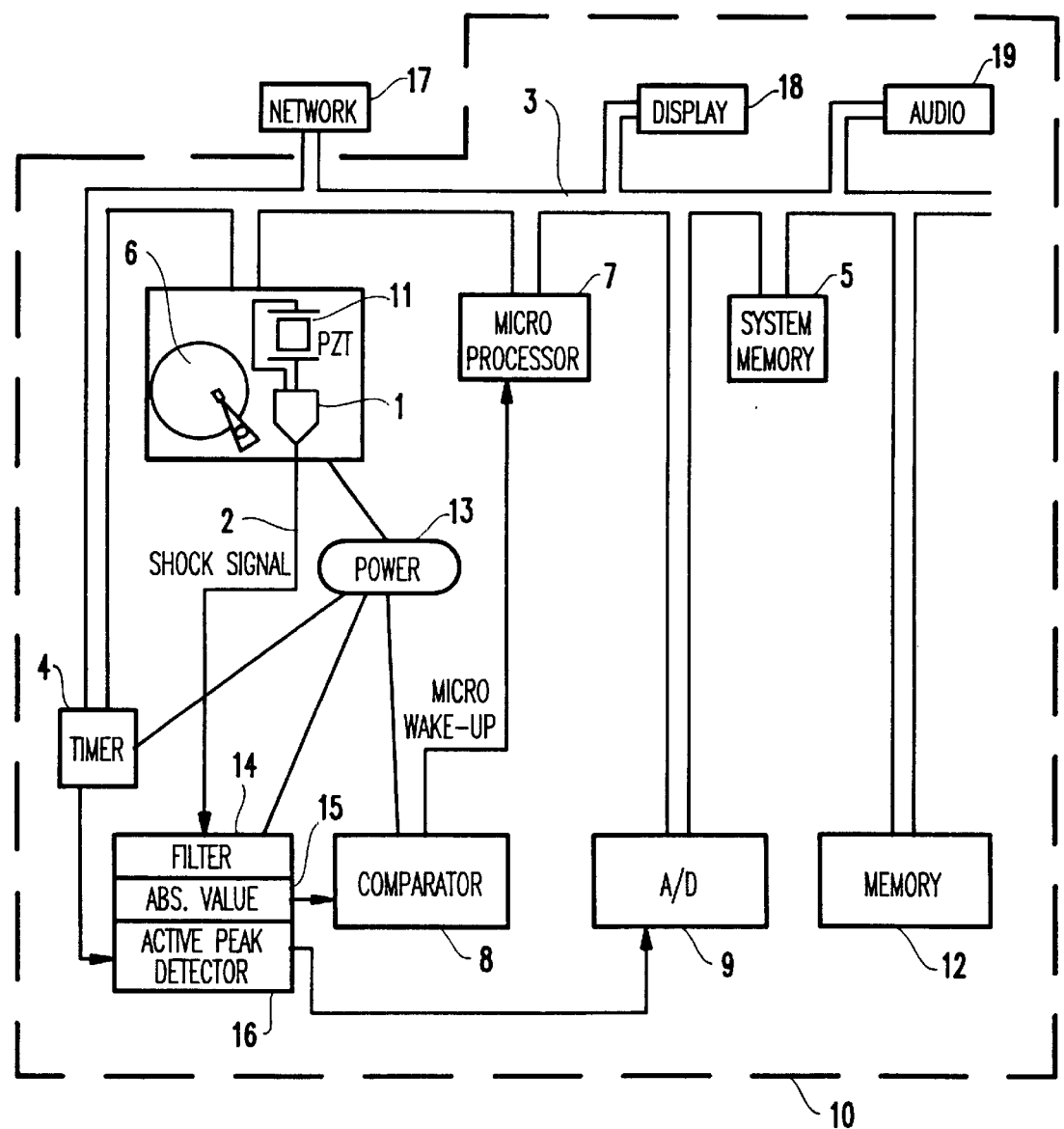
FIG. 1 is a schematic diagram of an electronic device according to the invention.

As mentioned above, electronic devices, such as mobile computers and handheld personal digital assistants (PDA) are constantly exposed to a hostile environments and it is sometimes impossible to protect such device against such environments. The invention allows diagnostic tools to be used when a potentially damaging event has been detected and notifies the user to inspect the electronic device for damage. If the consequences of severe environmental conditions shock impacts are detected in time, newly marginal sectors in, for example, a hard drive may be spared. Further, if the electronic device is connected to a network, damage data can be uploaded into an appropriate database and the proper preventive maintenance can be performed automatically. Also, the device can initiate a diagnostic procedure and notify the user of the state of the device.

More specifically, the invention provides the user with a history of abnormal events and warns the user of potential damage. For example, with respect to a direct access storage device (DASD), such as a computer hard disk, the invention may display acceleration in real time, scan the hard disk for new damage and spare any tracks which are deemed marginal.

While the invention is described below with respect to an acceleration sensor which detects force or shock on an object, as would be known by one ordinarily skilled in the art given this disclosure, the invention is equally applicable to measuring any environmental input which may damage a device such as temperature, barometric pressure, humidity, nuclear or electromagnetic radiation, etc. Therefore, the invention can be easily modified by replacing the acceleration sensor 11 with an input sensor to detect one or more environmental inputs. If the environmental input(s) exceed the allowed product operating range, then the information would be conveyed to the user and/or a diagnostic program would be initiated to look for damage to the device.

In a first embodiment, the invention records potentially damaging events which may be experienced by an electronic device 10 with the acceleration sensing unit 11, such as an accelerometer and a suitable data acquisition system, as shown in FIG. 1. Accelerometers are readily available. For example, Murata Electronics of North America, Inc. located at 2200 Lake Park Drive, Smyrna Ga., U.S.A. produces a MURATA PKCS-00LA-TC which would be useful with the inventive structure.

For example, as is well known by those ordinarily skilled in the art, an accelerometer can include a piezoelectric transducer combined with an inertial mass to measure acceleration. Built-in electronics (such as a preamp 1) convert the high impedance signals of the piezoelectric transducer into a voltage suitable for transmitting (e.g., acceleration signal 2).

The acceleration sensing unit 11 and detection system is always supplied with power from a power supply 13, which can be the electronic device's main power supply or an auxiliary power supply, such as a battery (e.g., +9V, +6V, +3.3V, etc.) which could be exclusively for the acceleration sensing unit 11, the preamp 1, the filter 14, the absolute value circuit 15, the active peak detector 16, the timer 4 and the comparator 8. Therefore, the invention operates when the remainder of the electronic device is on and when it is off.

The data from the accelerometer 11 is preferably filtered with a filter circuit 14, which could be, for example, a low pass filter, prior to being input to an absolute value circuit 15. A comparator 8 determines whether the absolute value of the acceleration signal output by the absolute value circuit 15 exceeds a threshold. If the absolute value exceeds the threshold, the signal is digitized by an A/D converter 9 and stored in a non-volatile memory 12.

The waveforms which are observed during shock or other environmental events are highly variable. One of the causes of this variability is the presence of strong high frequency components which become more pronounced as the colliding surfaces become harder. On the other hand low frequency components are more reproducible from collision to collision. If the acceleration is integrated (in time), the contributions from the high frequency components yield velocities and displacements which are small. Thus, as the frequency increases, given the same acceleration, the damage potential decreases in most cases. Because of the large variability and large amount of structure which can actually obscure the true nature of the collision, the invention optionally uses low pass filtering 14.

The corner frequency of the low pass filter 14 should match the device being protected. For example, for a laptop computer hard disk, criterion which may be considered could include the slider lift-off which; can result in slider or disk surface damage when the slider returns to the disk. The g value for slider liftoff is a bathtub shaped function of the pulse width, increasing for pulse durations below 0.6 ms as well as durations above 1.2 ms. For pulse durations of 1.0 ms, slider liftoff occurs at roughly 50 g, whereas at a pulse duration of 0.3 ms, liftoff occurs in a range between 100 to 200 g.

As mentioned above, the acceleration sensor 11 provides, after processing and detecting, warning feedback to the user indicating potential damage to the drive (e.g., corresponding to slider liftoff). However, short pulses record with very high g levels and may erroneously imply disk damage. Therefore, the corner frequency should be selected such that the filter will pass a 0.3 ms pulse with only a small attenuation. Thus, for the current example of the invention used to protect the hard disk of a laptop computer, the low pass corner frequency of the filter 14 should be approximately 3 KHz (e.g., corresponding to 0.3 ms).

Further, as mentioned above, the signal received is then preferably passed through the absolute value circuit 15 (e.g., a full wave rectifier) to allow equal detection of positive and negative acceleration. Absolute value circuits convert negative values into positive values and allow positive values to remain unchanged. The operation and construction of absolute value circuits is well known to those ordinarily skilled in the art.

The data is actively peak detected within a circuit 16 which has minimum droop during a predetermined interval (e.g., one minute). For example, the active peak detection circuit 16 retains only the highest value produced by the acceleration sensing unit 11 during the given time period. Thus, the active peak detection circuit 16 replaces the stored value only if the incoming value is greater than the stored value. After the given time period, which in this example is preferably 1 minute, the active peak detection device 16 is reset and begins the process of recording a new peak value again.

To save power, the comparator 8 can be activated once during the active peak device's cycle time period (e.g, once a minute). Further, the comparator 8 is activated just long enough to determine if the data in the active peak detection device 16 exceeds a preset threshold value of, say 200 g. The active peak detector 16 can then either reset itself using the timer 4 or be reset by the microprocessor 7.

If the acceleration data exceeds the preset threshold, the comparator 8 sends a signal to power up the processor 7 which causes the A/D converter 9 to digitize the data and store the same in the non-volatile memory 12 (e.g., a flash memory) which can be separate from the volatile system memory 5. As would be known by one ordinarily skilled in the art given this disclosure, the device for storing the peak acceleration value output may be any number of different type electronic devices and configurations.

The memory 12 is normally in a low power state until the digitized data is ready to be transferred along with other information, such as (in the example of a mobile computer hard drive) the track position, sector number, time and date, and (if device includes a global positioning system (GPS)) the geographic location.

In a preferred embodiment, when the device is turned on, there could be an optional history of the magnitude of recent significant shock or other environmental events along with the time and date (and possibly location) output using a device capable of communicating with the user (e.g., displayed on a display device 18) connected to the other elements of the electronic device 10 by a system bus 3. This information allows the user to reconstruct the damage sequence and hopefully avoid future events. The information could also advise the user that a diagnostic program should be initiated.

Also, the invention optionally may display the acceleration (or other environmental input) history information graphically in a "fever thermometer" or bar graph form. In addition, if the acceleration (or other environmental input) exceeds a value (e.g., 200 g), which can be set by the user or permanently set, the unit could immediately output a sound through an audio device (or audio subsystem) 19, such as a speaker, voice synthesizer, etc., to immediately alert the user of a dangerous event. For example, the sound could be a synthesized human voice stating "ouch" or other human-type verbal response to impact shock (or other appropriate graduated response to another associated environmental input such as "I'm very warm", "I'm too hot" for different temperatures, etc.), or could be an alarm, such as a beep, to provide immediate feedback to the user. In addition, the invention could omit the need for the display device 18 and simply rely upon the audio device 19 to provide feedback to the user of events that exceed (or have previously exceeded) prescribed environmental limits.

Further, in another embodiment of the invention, the microprocessor 7 could automatically run a diagnostic program to determine whether the disk drive 6 was damaged if the peak shock value exceeded a certain value (which could also be varied by the user).

There are many diagnostic systems and programs which can be utilized with the invention, as would be well known to those ordinarily skilled in the art. The diagnostic program or system selected will depend upon the specific electronic device being protected and the type of environmental event.

For example, the direct access storage device 6 of a mobile computer 10 has been discussed above. There are many well-known diagnostic programs currently available which evaluate the condition of direct access storage devices, such as a computer hard drive. Thus, a diagnostic tool could be ordered to scan the area of a hard disk where the read/write heads were located when the high acceleration was detected using, for example, thermal proximity sensing. If the diagnostic program finds areas with significant damage, the user could be warned to copy the data (if it is still readable) in the damaged area and to spare the damaged. Otherwise, a warning could be displayed that the data is not recoverable at that location.

Most electronic devices are connected to a network 17 at least some of the time. Such a connection facilitates an automated service and repair capability. Thus, in another embodiment of the invention, when the electronic device 10 is reconnected to the network 17 (after being used and transported in the field) the server will interrogate the microprocessor 7 and inquire whether serious shock events have taken place. A central system in the network 17 could log such events and, in the event of severe damage, could initiate an automatic service call to have the disk drive 6 repaired. The severity judgement could be derived from either the shock data or diagnostic data or both. The system response could vary from a warning that a moderate shock has occurred to an immediate repair if severe damage is detected.

FIG. 2 is a flow diagram of an embodiment of the invention. More specifically, in item 20 the shock impact (or other environmental input) is detected by the acceleration sensing unit 11. In item 21, the signal 2 from the acceleration sensing unit 11 is filtered using the filter circuit 14. Then, using the absolute value circuit 15, the signal is converted to an absolute value as shown in item 22.

In the power saving mode, the shock signal is tracked and held by an active peak detection circuit 16, as shown in item 23. In the non-power saving mode, as shown by the arrow, item 23 is bypassed. The comparator 8 samples the active peak detection circuit 16 once during each of the peak detection cycles in the power saving mode or simply receives the signal directly from the absolute value circuit 15 in the non-power saving mode, as shown in item 25.

If the shock impact is greater than a threshold, the comparator 8 wakes up the microprocessor 7 in the power saving mode, as shown in item 26. In the non-power saving mode (indicated by the arrow in FIG. 2), the microprocessor 7 is on and does not need to be woken up and item 26 is omitted. The microprocessor 7 activates the A/D converter 9, system memory 5 and flashmemory 12.

The signal is digitized with the A/D converter 9 as shown in item 27 and the digitized signal is stored and in memory 12 as shown in item 28. In addition, the other information such as date, time, track, sector and geographic location of the shock detection are also stored in the memory 12. Also, at this time, an audible signal may be sent to the audio subsystem 19 as shown in item 31.

When the electronic device is powered up, any shocks which were large enough to be stored in the memory 12 are displayed on the display screen 18 as shown in item 32. In item 29, if so enabled, an automatic diagnoses program can be initiated. As discussed above, any defective sectors that are found can be spared in item 30.

As, shown in FIG. 3, when the electronic device 10 is connected to a network, any shock impacts recorded in the memory 12 can be reported to the network system, as shown in item 40. A surface scan can be performed 41 and any automated service or log programs can be performed at that time, as in item 42. Any defective sectors that are found can be spared as in item 43.

As shown above, the inventive combination of shock detection and subsequent damage diagnosis will significantly increase the reliability of disk drives within mobile computers because the invention provides the user with shock detection tools whether the unit is operating or not. Also, the invention's diagnostics locate damage and allow sparing of this damaged area and copying of any potentially damaged data into undamaged areas. The network connection could log shock and damage data and initiate automatic service and repair.

While the invention has been described in terms of preferred embodiments, those skilled in the art will recognize that the invention can be practiced with modification within the spirit and scope of the appended claims. For example, while the invention has been described above using a laptop computer example, the invention is equally applicable to any form of portable or stationary electronic device. For example, the invention can be equally used with portable electronic devices, such as personal digital assistants (PDAs), cellular-phones, pagers, portable communications equipment, portable receivers, radios and computers used within land-based vehicles, water-borne vehicles, aircraft and spacecraft.

By providing a history of time and geographic location of shock or other environmental inputs, the user can take steps to avoid future potentially damaging incidents. Also in lieu of using a simple threshold to determine disk drive damage, a function of the data could be used to intelligently determine the probability of damage.

In addition to measuring shock inputs, as mentioned above, the invention is also applicable to measuring any environmental input such as temperature, barometric pressure, humidity, electromagnetic radiation, etc. The same implementation as shown in FIG. 1 would apply by simply replacing the shock sensor with an input sensor to detect one or more environmental inputs. If the environmental inputs exceed the allowed product operating range or integrated exposure, then the information would be conveyed to the user and/or a diagnostic program would be initiated to look for damage to the device.

What is claimed is:

1. An electronic device comprising:
    a sensor outputting signals indicating environmental conditions experienced by said electronic device;
    a non-volatile memory storing ones of said signals that exceed a limit; and
    an audible output device outputting signals stored in said non-volatile memory, thereby providing feedback of said environmental conditions experienced by said electronic device that exceed said limit;
    wherein said sensor and said non-volatile memory operate when said electronic device is off and, when said electronic device is turned on, said non-volatile memory provides said history through said output device, and
    wherein, when said environmental conditions exceed an alert threshold, said audible output device immediately sounds an alert, both when said device is off and when said device is on.

2. The electronic device in claim 1, wherein said output device comprises a display device.

3. The electronic device in claim 1, wherein said signals indicate when said environmental conditions occurred and a magnitude of said environmental conditions.

4. The electronic device in claim 1, wherein said non-volatile memory initiates a diagnostic program after said electronic device experiences an environmental condition that exceeds said limit, wherein said diagnostic program evaluates whether said environmental condition has damaged said electronic device.

5. The electronic device in claim 1, further including a connection to a network, said signals stored in said non-volatile memory being transmitted to said network.

6. A portable computing device comprising:
    an acceleration sensing unit outputting signals indicating accelerations experienced by said portable computing device;
    a non-volatile memory storing ones of said signals that exceed a limit; and
    an audible output device outputting signals stored in said non-volatile memory, thereby providing immediate feedback of said accelerations experienced by said portable computing device that exceed said limit, both when said device is on and when said device is off.

7. The portable computing device in claim 6, wherein said output device comprises a display device.

8. The portable computing device in claim 6, further comprising a direct access storage device wherein said signals indicate when said accelerations occurred, a magnitude of said accelerations, and a position of a slider of said direct access storage device when said accelerations occurred.

9. The portable computing device in claim 8, wherein said non-volatile memory initiates a diagnostic program after said computer experiences acceleration that exceeds said limit, wherein said diagnostic program evaluates whether said acceleration has damaged said direct access storage device.

10. The portable computing device in claim 6, further including a connection to a network, said signals stored in said non-volatile memory being transmitted to said network.

11. The portable computing device in claim 6, wherein said acceleration sensing unit and said non-volatile memory operate when said portable computing device is off and, when said portable computing device is turned on, said non-volatile memory displays said history on said output device.

12. A method for protecting an electronic device comprising:
    detecting environmental conditions experienced by said electronic device;
    generating signals indicating said environmental conditions experienced by said electronic device;
    storing ones of said signals that exceed a limit;
    outputting signals stored in said non-volatile memory, thereby providing feedback of said environmental conditions experienced by said electronic device that exceed said limit; and
    performing said detecting, said generating, and said storing when said electronic device is off and, when said electronic device is turned on, performing said outputting,
    wherein, when said environmental conditions exceed an alert threshold above said limit, said device immediately sounds an alert, both when said device is off and when said device is on.

13. The method in claim 12, wherein said outputting comprises generating a display.

14. The method in claim 12, wherein said signals indicate when said environmental conditions occurred and a magnitude of said environmental conditions.

15. The method in claim 12, further comprising initiating a diagnostic program after said electronic device experiences an environmental condition that exceeds said limit, wherein said diagnostic program evaluates whether said environmental condition has damaged said electronic device.

16. The method in claim 12, further comprising transmitting said signals in said non-volatile memory to an external network.

17. An electronic device comprising:
    a sensor outputting signals indicating environmental conditions experienced by said electronic device;
    a non-volatile memory storing ones of said signals that exceed a limit;
    an output device outputting signals stored in said non-volatile memory, thereby providing a history of said environmental conditions experienced by said electronic device that exceed said limit; and
    a peak detection unit storing a largest one of said signals said non-volatile memory periodically sampling said peak detection unit,
    wherein said sensor and said non-volatile memory operate when said electronic device is off and, when said electronic device is turned on, said non-volatile memory provides said history through said output device.

18. A portable computing device comprising:

an acceleration sensing unit outputting signals indicating accelerations experienced by said portable computing device;

a non-volatile memory storing ones of said signals that exceed a limit;

an audible output device outputting signals stored in said non-volatile memory, thereby providing a history of said accelerations experienced by said portable computing device that exceed said limit; and a peak detection unit storing a largest one of said signals, said non-volatile memory periodically said peak detection unit.

19. A method for protecting an electronic device comprising:

detecting environmental conditions experienced by said electronic device;

generating signals indicating said environmental conditions experienced by said electronic device;

storing ones of said signals that exceed a limit;

outputting signals stored in said non-volatile memory, thereby providing a history of said environmental conditions experienced by said electronic device that exceed said limit;

performing said detecting, said generating, and said storing when said electronic device is off and, when said electronic device is turned on, performing said outputting;

periodically storing a largest signal of said signals; and periodically sampling and resetting said largest signal.

* * * * *